US011138785B2

(12) United States Patent
Choi et al.

(10) Patent No.: US 11,138,785 B2
(45) Date of Patent: Oct. 5, 2021

(54) METHOD AND SYSTEM FOR GENERATING 3D IMAGE OF CHARACTER

(71) Applicant: Electronics and Telecommunications Research Institute, Daejeon (KR)

(72) Inventors: Jin Sung Choi, Daejeon (KR); Seung Wook Lee, Daejeon (KR); Tae-Joon Kim, Sejong-si (KR); Seung Uk Yoon, Daejeon (KR); Seong Jae Lim, Daejeon (KR); Bon Woo Hwang, Daejeon (KR); Chang Joon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/691,160

(22) Filed: Nov. 21, 2019

(65) Prior Publication Data
US 2020/0184711 A1    Jun. 11, 2020

(30) Foreign Application Priority Data

Dec. 7, 2018  (KR) .................. 10-2018-0157599
Oct. 30, 2019 (KR) .................. 10-2019-0136782

(51) Int. Cl.
*G06T 15/20* (2011.01)
*G06N 3/04* (2006.01)
*G06N 3/08* (2006.01)

(52) U.S. Cl.
CPC ............ *G06T 15/205* (2013.01); *G06N 3/04* (2013.01); *G06N 3/08* (2013.01)

(58) Field of Classification Search
CPC ........... G06T 15/205; G06N 3/04; G06N 3/08
See application file for complete search history.

(56) References Cited

U.S. PATENT DOCUMENTS

| 10,321,728 | B1* | 6/2019 | Koh ..................... G06N 3/0454 |
| 2016/0027200 | A1* | 1/2016 | Corazza ............ G06K 9/00362 |
| | | | 345/420 |
| 2016/0335485 | A1 | 11/2016 | Kim |
| 2017/0116776 | A1 | 4/2017 | Aughey |
| 2017/0200313 | A1 | 7/2017 | Lee et al. |
| 2017/0213378 | A1* | 7/2017 | Mandel .................. G06T 13/80 |
| 2020/0013232 | A1* | 1/2020 | Kwai ..................... G06T 13/40 |

FOREIGN PATENT DOCUMENTS

KR       101906431 B1    10/2018

* cited by examiner

*Primary Examiner* — Chong Wu
(74) *Attorney, Agent, or Firm* — William Park & Associates Ltd.

(57) ABSTRACT

A method and a system for generating a 3D image of a character through steps of: receiving an identifier of a template and a two-dimensional (2D) image of the character generated based on the template corresponding to a type of the character; acquiring template information of the template from a template library by using the identifier, and extracting an effective parameter for machine learning to be performed to generate the 3D image based on the template information and the 2D image; and generating the 3D image of the character by performing the machine learning based on the effective parameter and the template information are provided.

16 Claims, 6 Drawing Sheets

METHOD AND SYSTEM FOR GENERATING 3D IMAGE OF CHARACTER

CROSS-REFERENCE TO RELATED APPLICATION

This application claims priority to and the benefit of Korean Patent Application Nos. 10-2018-0157599 and 10-2019-0136782 filed in the Korean Intellectual Property Office on Dec. 7, 2018 and Oct. 30, 2019, respectively, the entire contents of which are incorporated herein by reference.

BACKGROUND OF THE INVENTION

(a) Field of the Invention

The present disclosure relates to a method and a system for generating a 3D image of a character from a 2D image produced by using a predetermined template.

(b) Description of the Related Art

Typically, 3D image reconstruction has been done manually by a designer using 3D modeling software. Therefore, in order to generate high quality 3D images of characters, much time and professional know-how are required. In addition, the quality of the 3D image varies according to the skill of the designers.

The 3D image of the character may be generated using a computer vision technology and an image processing scheme. According to a method utilizing the computer vision and the image processing, some feature points are extracted through an analysis for multiple images at an arbitrary point in time, camera positions in a 3D space are calculated based on the extracted feature points, and the 3D image of the character may be reconstructed by connecting a plurality of 2D images based on front and back relationships between the plurality of 2D images.

Recently, with the development of large-scale databases and artificial intelligence technologies such as deep learning, computer vision problems that are difficult to resolve by conventional methods are beginning to be solved. The TL-embedding network in which the structures of an Alexnet are combined and the auto-encoder that learns shape information of 2D images and corresponding 3D images are representative examples of the case where the deep learning techniques is applied to the reconstruction of 3D models (a character in a game, etc.). When the shape information of a plurality of images and 3D images represented by voxels is input, the TL-embedding network may generate the most similar 3D voxel model after learning the input data. 3D Recurrent Reconstruction Neural Network is a deep learning network based on long short-term memory structure that performs machine learning with input of 2D images captured from various viewpoints and restores 3D voxel models. The 3D Regression Reconstruction Neural Network has shown a relatively good reconstruction performance for the real image compared to the conventional single 2D image-based reconstruction technique.

Deep learning-based 3D reconstruction using 2D images has been actively studied since the release of Shapenet's data set, and has shown superior results over traditional techniques. However, the voxel resolution of the reconstructed 3D model is still low resolution (e.g., 64×64×64).

SUMMARY OF THE INVENTION

An exemplary embodiment provides a method for generating a three-dimensional (3D) image of a character. The generation method of the 3D image includes: receiving an identifier of a template and a two-dimensional (2D) image of the character generated based on the template corresponding to a type of the character; acquiring template information of the template from a template library by using the identifier, and extracting an effective parameter for machine learning to be performed to generate the 3D image based on the template information and the 2D image; and generating the 3D image of the character by performing the machine learning based on the effective parameter and the template information.

The template information may include a gender of the character and an age of the character, and the 2D image represents a character of the age having the gender.

The template information may further include style information of the character, and the generating the 3D image of the character by performing the machine learning based on the effective parameter and the template information may include performing the machine learning by using an inference engine that transforms a 3D image according to the style information.

The template may include the template information and a silhouette, and the 2D image may be an image of the character produced based on the silhouette.

The effective parameter may include a plurality of template images mapped to each body part of the silhouette.

The method may further include determining a correlation between body parts of the character based on the 2D image and a three-dimensional template of the template and the generating the 3D image of the character by performing the machine learning based on the effective parameter and the template information may include performing the machine learning to synthesize the plurality of template images by using the correlation.

Another exemplary embodiment provides a system for generating a three-dimensional (3D) image of a character. The system includes: a template library configured to store a plurality of templates representing the type of the character; a pre-processing unit configured to extract an effective parameter for machine learning to be performed to generate the 3D image based on template information of a first template of the plurality of templates and a two-dimensional (2D) image of the character which is generated based on the first template; and a modeler configured to generate the 3D image of the character by performing the machine learning based on the effective parameter.

The template information may include a gender of the character and an age of the character, and the 2D image may represent a character of the age having the gender.

The template information may further include style information of the character, and the modeler may further be configured to perform the machine learning by using an inference engine that transforms the 3D image according to the style information.

The first template may include the template information and a silhouette and the 2D image may be an image of the character produced based on the silhouette.

The effective parameter may include a plurality of template images mapped to each body part of the silhouette.

The pre-processing unit may further be configured to determine a correlation between body parts of the character based on the 3D template of the template and the 2D image and the modeler may further be configured to perform the machine learning to synthesize the plurality of template images by using the correlation.

Yet another exemplary embodiment provides an apparatus for pre-processing image information of a character. The apparatus includes: a processor, a memory, and a transmission/reception interface, wherein the processor executes a program stored in the memory to perform: receiving an identifier of a template and a two-dimensional (2D) image of the character generated on the basis of the template corresponding to a type of the character through the transmission/reception interface; acquiring template information of the template by using the identifier, and extract an effective parameter for machine learning to be performed to generate a three-dimensional (3D) image by using the template information and the 2D image; and structuralizing the template information and the effective parameter into a data structure and transmitting the data structure to the modeler performing the machine learning through the transmission/reception interface.

The processor may execute the program to further perform determining a correlation between body parts of the character based on a 3D template of the template and the 2D image, and the processor, when structuralizing the template information and the effective parameter into a data structure and transmitting the data structure to the modeler performing the machine learning through the transmission/reception interface, may perform structuralizing the correlation into the data structure along with the template information and the effective parameter.

The template information may include style information of the character, the data structure may include instruction information regarding an inference neural network of the modeler, and the instruction information may indicate an inference neural network corresponding to the body part to the modeler.

The template information may include style information of the character, the data structure may include instruction information regarding an inference neural network of the modeler, and the instruction information may indicate an inference neural network corresponding to the style information to the modeler.

DETAILED DESCRIPTION OF THE EMBODIMENTS

Figure 1:
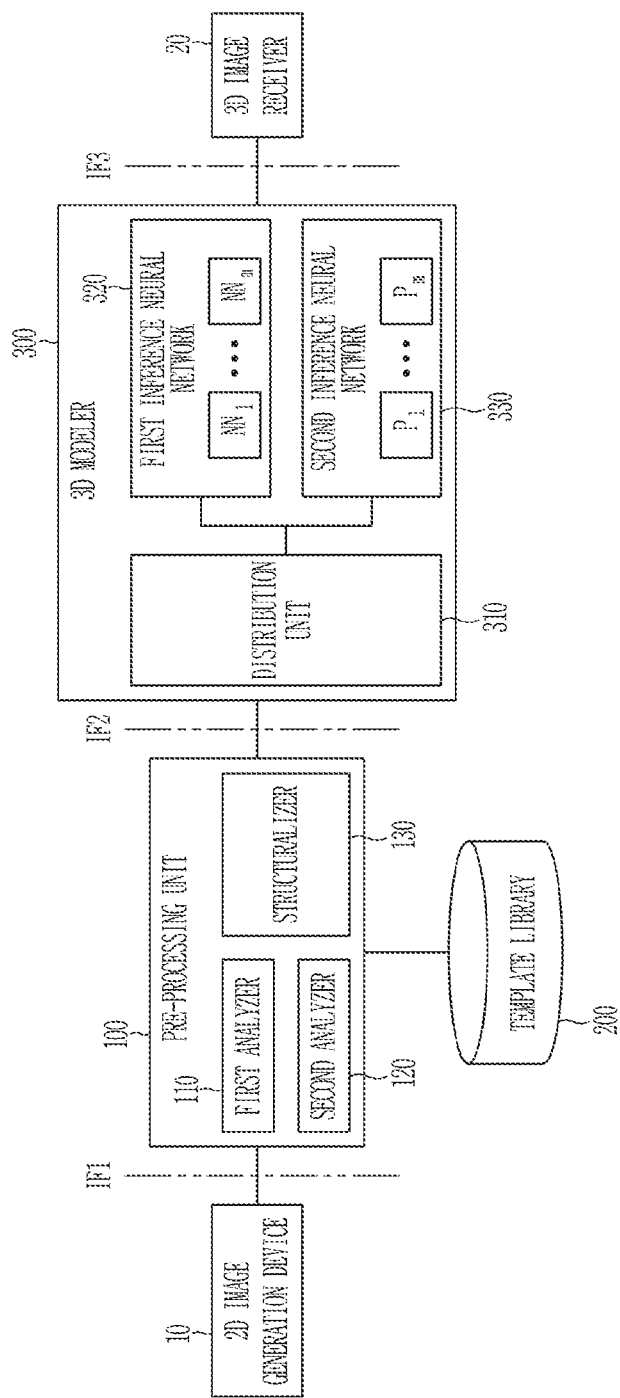
FIG. 1 is a block diagram illustrating an image generation system for generating a 3D image of a character according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Figure 2A:
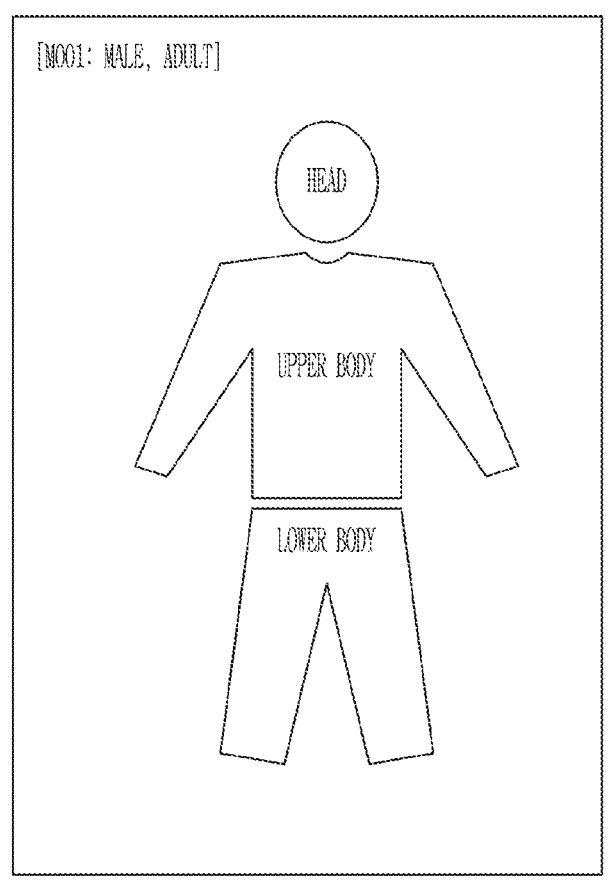
FIG. 2A is a conceptual diagram illustrating silhouette and template information of a 2D template according to an exemplary embodiment.
Figure 2B:
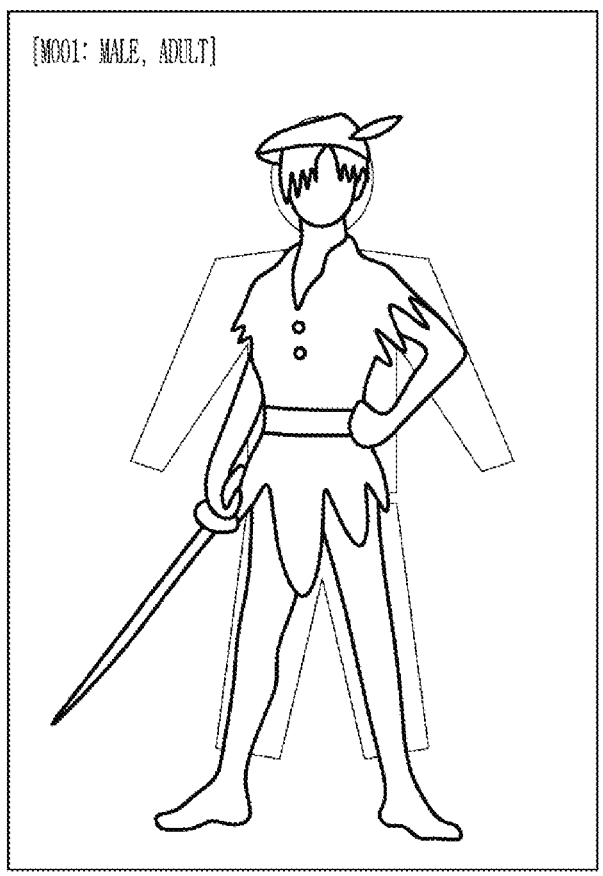
FIG. 2B is a conceptual diagram illustrating a 2D image of the character drawn on the silhouette of the 2D template according to an exemplary embodiment.

FIG. 1 is a block diagram illustrating an image generation system for generating a 3D image of a character according to an exemplary embodiment, FIG. 2A is a conceptual diagram illustrating silhouette and template information of a 2D template according to an exemplary embodiment, and FIG. 2B is a conceptual diagram illustrating a 2D image of the character drawn on the silhouette of the 2D template according to an exemplary embodiment.

Referring to FIG. 1, an image generation system for generating a 3D image of a character according to an exemplary embodiment includes a pre-processing unit 100, a template library 200, and a modeler 300. A user may acquire the 3D image from the 2D image of the character by using the image generation system according to the exemplary embodiment. The user may produce a digital 2D image or an analog 2D image by using the template obtained from the template library 200. For example, the user may download the template from the template library 200 through a communication network and produce the digital 2D image of the character on the silhouette of the downloaded template by using a tablet PC and a stylus pen or the like. Alternatively, the user may print the silhouette of the template downloaded from the template library 200 by using a printer, draw the 2D image of the character on the printed silhouette, and then convert the 2D image into the digital 2D image by using a scanner or a photographing device. Since the 2D image is produced to be superimposed on the silhouette of the template, the modeler 300 may generate a more accurate 3D image from machine learning such as deep learning based on the relationship between the template and the 2D image produced on the silhouette of the template.

When the 2D image of the character and an identifier of the template used for the production of the 2D image are received by the image generating system, the image generation system may generate a 3D image of the character based on the 2D image of the character and the identifier of the template. The user may input the 3D image of the character and information of the template (e.g., the identifier of the template) into the image generating system, or input the 2D image of the character and the downloaded template into the image generating system. The pre-processing unit 100 may receive the 2D image of the character and the identifier of the template used to produce the 2D image from the 2D image generation device 10 through the first interface IF1. When the identifier of the template is input to the pre-processing unit 100, the pre-processing unit 100 of the image generating system may search for the template in the template library 200 by using the template identifier and acquire template information of the searched template.

The pre-processing unit 100 according to the exemplary embodiment includes a first analyzer 110, a second analyzer 120, and a structuralizer 130.

The first analyzer 110 of the pre-processing unit 100 according to the exemplary embodiment may extract at least one effective parameter which is appropriate and optimized for machine learning of the modeler 300 based on the 2D image of the character and the identifier of the template used for the 2D image received from the user. The at least one effective parameter may include a plurality of template images mapped to each body part of the silhouette of the template. For example, when the user draws a 2D image of a character on the silhouette of the template as shown in FIG.

2B, the first analyzer 110 may divide the 2D image into a head part, an upper body part, and a lower body part, and generate the plurality of template images based on the divided silhouette of the template. Each of the plurality of template images may correspond to each of the body part (that is, the head part, the upper body part, and the lower body part) of the silhouette, respectively. The template used by the first analyzer 110 may be the 2D template or the 3D template.

The second analyzer 120 of the pre-processing unit 100 may additionally analyze the 2D image based on the 3D template. When the image generation system acquires the 3D template of the template by using the identifier of the template, the second analyzer 120 may determine a correlation between the body parts of the character based on the 3D template and the 2D image.

The structuralizer 130 of the pre-processing unit 100 may structure the template information of the template used to produce the 2D image of the character and the at least one effective parameter extracted by the first analyzer 110. The structuralizer 130 may also structure an original 2D image of the character by using a predetermined format along with the template information and the at least one effective parameter. The template information and the at least one effective parameter structured by the structuralizer 130 may constitute a data structure used to be passed to the modeler 300. The data structure may further include the 2D image of the character. When the pre-processing unit 100 and the modeler 300 are connected to each other through a wired or a wireless network, the 2D image of the character, the template information, and the at least one effective parameter may be wrapped in a secure manner through the structuralizing, and may be transmitted from the pre-processing unit 100 to the modeler 300. The structuralizer 130 may structure the 2D image of the character, the template information, and the at least one effective parameter in a format such as XML (Extensible Markup Language). The structuralizer 130 according to another exemplary embodiment may further structure the correlation between the body parts of the character along with the 2D image of the character, the template information, and the at least one effective parameter.

The data structure structured by the structuralizer 130 may include instruction information regarding an inference neural network of the modeler 300. The instruction information about the inference neural network included in the data structure may indicate an inference engine or an inference neural network corresponding to each body part. For example, when the silhouette includes the head, the upper body, and the lower body as the body parts and there is no part of the 2D image corresponding to the lower body part, the instruction information about the inference neural network may indicate a head inference engine used for generating a partial 3D image of the head part and an upper body inference engine used for generating a partial 3D image of the upper body part.

Alternatively, when a 2D image corresponds to each body part included in the silhouette and an image (e.g., a hand held weapon, etc.) that does not correspond to body parts is included in the 2D image of the character, the instruction information about the inference neural network may indicate a peripheral inference engine (e.g., an equipment inference engine for generating a 3D image of equipment such as a weapon) for generating a 3D image of an 2D image that does not correspond to any of the body parts.

Alternatively, the instruction information about the inference neural network may indicate an inference engine or an inference neural network corresponding to the style (cute style, elegant style, etc.) of the character. The modeler 300 may select one of the inference engines or the inference neural networks that converts the 3D image according to the style of the character, and may perform machine learning in such a manner as to multiply the effective parameter by weight corresponding to the style of the character predetermined through the template. For example, when the style information for the character is predetermined as 'cute' by the template, the instruction information regarding the inference neural network may indicate an inference engine or an inference neural network suitable for transforming the 3D image according to the 'cute' style. The type of the inference neural network for generating the 3D image of the character may be determined according to the indication information included in the data structure. The predetermined format used for structuralizing by the structuralizer 130 may be a data format that may be used for a newly developed inference engine or a cloud-based AI service platform.

In the template library 200 according to an exemplary embodiment, various templates may be stored according to genders, age, and style (fatness, cuteness, etc.) of the character. For example, the template may correspond to the type of the character such as the gender, the age, the style, etc., and the type of the character represented by one template may be included in the template as the template information. The template information may include the gender, the age, the style, etc. of the character represented by the template. For example, the template library 200 may store various different templates for each race (or tribe) in a game, so as to generate an in-game character. That is, different templates may exist according to the races of the character. The identifier may correspond to the template, and the 2D template and the 3D template may correspond to one identifier together. Each template includes at least one silhouette representing a front view, a back view, side views, a plane view, a bottom view, and the like of the character. The 3D template having the same identifier as the 2D template used to produce the 2D image of the character may be used when the correlation between the body parts of the character is determined by the second analyzer 120. The template library 200 may be improved through values or parameters acquired in the process of the extracting the at least one effective parameter.

In the silhouette of the template shown in FIG. 2A, M001 is the identifier of the template, and M001 template is a template for producing an adult-male character. For example, according to the silhouette of the M001 template, the user may draw the character's front face on the head silhouette, draw the characters jacket on the upper body silhouette, and draw the characters pants on the lower body silhouette. Another 2D image may also be drawn by the user in a silhouette in different directions corresponding to the identifier M001.

The modeler 300 according to an exemplary embodiment includes a distribution unit 310, a first inference neural network 320, and a second inference neural network 330. The modeler 300 may further include another inference neural network according to the type or the style of the 3D image. The modeler 300 may receive the data structure from the pre-processing unit 100 through the second interface IF2 and generate the 3D image by driving the inference neural networks using the data structure.

The distribution unit 310 may determine an inference neural network on which the machine learning for generating the 3D image is to be performed based on the indication information included in the data structure. Alternatively, the distribution unit 310 may determine the inference neural network on which the machine learning is to be performed according to the type of the template used when the 2D image is produced.

The first inference neural network 320 may include a plurality of inference engines $NN_1$ to $NN_m$ which are multiplexed, and perform the machine learning by driving the plurality of inference engines based on the at least one effective parameter and the template information included in the data structure. For example, the first inference neural network 320 may perform a weighted sum operation to generate a 3D image suitable for the style of the template included in the template information. The first inference neural network 320 may be a weighted neural network. The first inference neural network 320 may be suitable for generating a 3D character image when the plurality of template images included in the data structure are distinguished as one overall characteristic. The training data may be specialized for each inference engine included in the first inference neural network 320, and an optimal inference engine for generating the 3D character image suitable for the style transmitted through the data structure may be determined for the machine learning.

The second inference neural network 330 may include a plurality of inference engines $P_1$ to $P_n$ which are multiplexed, and may generate the 3D image of the character by running the plurality of inference engines based on the plurality of template images corresponding to the body parts and the correlation determined through the 3D template among effective parameters included in the data structure. The second inference neural network 330 may be a partial 3D reconstruction neural network. The second inference neural network 330 may perform the machine learning to synthesize the plurality of template images corresponding to each of the body part by using the correlation between the body parts determined through the 3D template.

The 3D image of the character generated by the first inference neural network 320 or the second inference neural network 330 of the modeler 300 may be fed back to the user who have produced or drawn the 2D image of the character. Alternatively, the 3D image of the character generated by the modeler 300 may be transmitted to a display device displaying content to which the character belongs. When the 3D image is transmitted to the display device, the data of the 3D image may be converted according to the performance profile of the 3D image receiver 20. In this case, the data conversion may be performed within a range in which major factors such as the shape or the texture of the 3D image are not lost.

Figure 3:
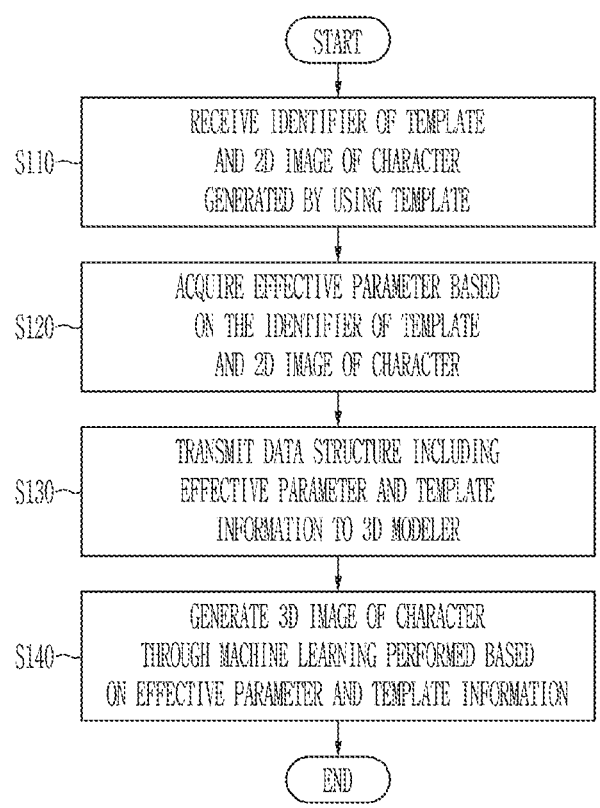
FIG. 3 is a flowchart illustrating a generation method of a 3D image of a character according to an exemplary embodiment.

FIG. 3 is a flowchart illustrating a generation method of a 3D image of a character according to an exemplary embodiment.

Referring to FIG. 3, the pre-processing unit 100 may receive a 2D image generated by a user by using a template of a template library 200 and an identifier of the template used when the 2D image of the character is generated (S110). The pre-processing unit 100 may inquire template information of the template used when the 2D image of the character is generated based on an identifier of the template in the template library 200. Referring to FIG. 2A, the pre-processing unit 100 may acquire the template information—gender: male, age: adult—from the template library 200 by using the identifier M001. Then, the first analyzer 110 of the pre-processing unit 100 may extract at least one effective parameter for machine learning to generate a 3D image based on the 2D image of the character and the template information (S120). The first analyzer 110 may extract the effective parameter by dividing the 2D image into a plurality of template images by using the template information.

Thereafter, the structuralizer 130 of the pre-processing unit 100 may generate a data structure by structuralizing the at least one effective parameter and the template information in a predetermined format and transmit the generated data structure to the modeler 300 (S130).

The distribution unit 310 of the modeler 300 may select an inference neural network for generating the 3D image from among a plurality of inference neural networks included in or connected to the modeler 300 based on the data structure. When selecting the inference neural network, the distribution unit 310 may use indication information included in the data structure or the template information included in the data structure. When the correlation between the body parts corresponding to the plurality of template images is not included in the data structure, the distribution unit 310 may select the first inference neural network 320 that performs the weight sum operation. Thereafter, the first inference neural network 320 may generate the 3D image of the character through machine learning that performs the weighted sum operation based on the at least one effective parameter and the template information (S140).

Figure 4:
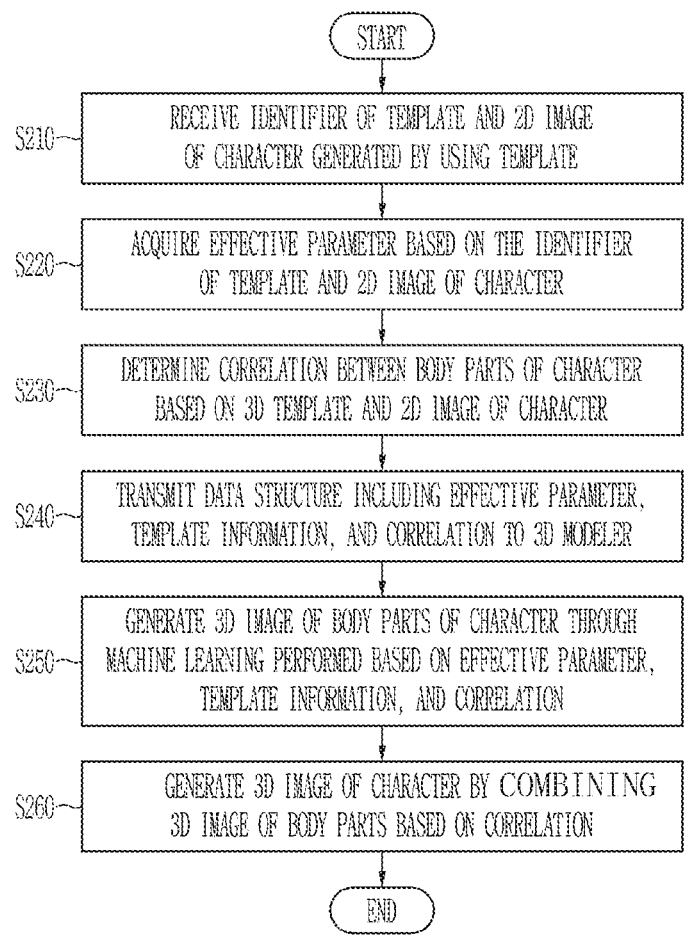
FIG. 4 is a flowchart illustrating a generation method of a 3D image of a character according to another exemplary embodiment.

FIG. 4 is a flowchart illustrating a generation method of a 3D image of a character according to another exemplary embodiment.

Referring to FIG. 4, the pre-processing unit 100 may receive a 2D image of a character generated by a user using a template and an identifier of the template used for generating the 2D image from the user (S210). Since the pre-processing unit 100 acquires the template information based on the identifier of the template in the same manner as in FIG. 3, details is not described herein again. Next, the pre-processing unit 100 may extract at least one effective parameter for machine learning to generate a 3D image by using the first analyzer 110 or the second analyzer 120 (S220). The first analyzer 110 may extract the at least one effective parameter by dividing the 2D image into a plurality of template images by using the template information. The second analyzer 120 may determine a correlation between body parts of the character by using a 3D template having the same identifier with the 2D template or corresponding to the identifier received from the user (S230). The correlation may correspond to each of the template images.

Then, the structuralizer 130 of the pre-processing unit 100 may generate a data structure by structuralizing the at least one effective parameter, the template information, and the correlation between body parts in a predetermined format, and transmit the generated data structure to the modeler 300 (S240).

The distribution unit 310 of the modeler 300 may select an inferred neural network for generating a 3D image from among a plurality of inferred neural networks included in the modeler 300 or connected to the modeler 300 based on the data structure. Since the correlation between the respective body parts corresponding to the plurality of template images is included in the data structure, the distribution unit 310 may select the second inference neural network 330, so that the second inference neural network 330 partially reconstructs the 3D image and determine a final 3D image by combining the partial 3D images. The second inference neural network 330 may generate 3D partial images for each of the body parts of the character by performing machine learning based on the at least one effective parameter and the template information (S250), and combine the 3D partial images based on the correlation between the body parts to generate the final 3D image of the character (S260).

As described above, effective parameters for increasing the accuracy and the speed of the machine learning performed by the inference neural network may be extracted through the 2D image produced based on the template stored in the template library and the template information of the template. Before the inference neural network generates the 3D image through machine learning, by performing pre-processing to extract the effective parameters suitable for the machine learning, an optimal inference neural network for the 3D image can be selected, and the multiplexing of the inference engine in the inference neural network can be optimized.

Figure 5:
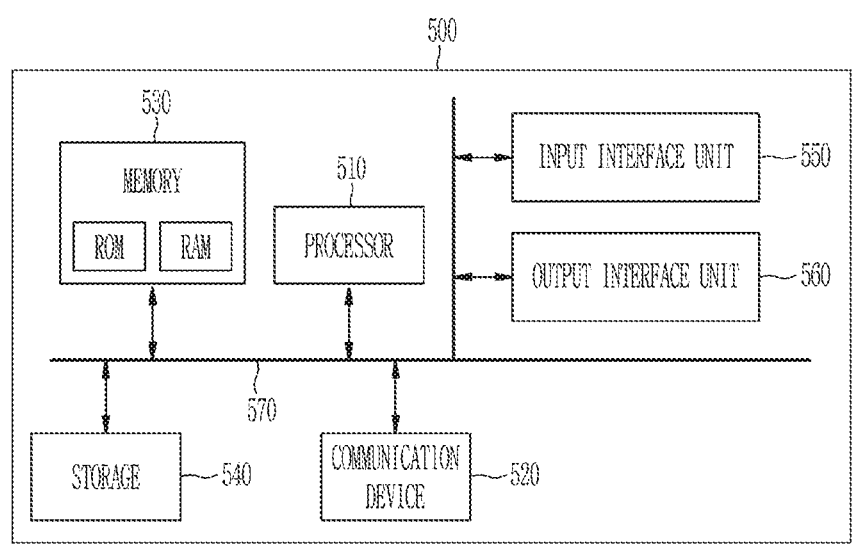
FIG. 5 is a block diagram illustrating a pre-processing apparatus for processing image information according to an exemplary embodiment.

FIG. 5 is a block diagram illustrating a pre-processing apparatus for processing image information according to an exemplary embodiment.

The apparatus for generating a virtual viewpoint image according to another exemplary embodiment may be implemented as a computer system, for example a computer readable medium. Referring to FIG. 5, a computer system 500 may include at least one of processor 510, a memory 530, an input interface 550, an output interface 560, and storage 540. The computer system 500 may also include a communication unit 520 coupled to a network. The processor 510 may be a central processing unit (CPU) or a semiconductor device that executes instructions stored in the memory 530 or storage 540. The memory 530 and the storage 540 may include various forms of volatile or non-volatile storage media. For example, the memory may include read only memory (ROM) or random access memory (RAM). In the exemplary embodiment of the present disclosure, the memory may be located inside or outside the processor, and the memory may be coupled to the processor through various means already known.

Thus, embodiments of the present invention may be embodied as a computer-implemented method or as a non-volatile computer-readable medium having computer-executable instructions stored thereon. In the exemplary embodiment, when executed by a processor, the computer-readable instructions may perform the method according to at least one aspect of the present disclosure. The network connection may transmit or receive a wired signal or a wireless signal.

On the contrary, the embodiments of the present invention are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like. Program instructions may include machine language code such as those produced by a compiler, as well as high-level language code that may be executed by a computer via an interpreter, or the like.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for generating a three-dimensional (3D) image of a character, the method comprising:
    receiving a two-dimensional (2D) image of the character generated based on a template;
    performing analysis related to body parts of the character based on template information of the template and analyzing effective parameters on the 2D image for machine learning to be performed to generate the 3D image; and
    generating the 3D image of the character by performing the machine learning based on a result of the analysis related to the body parts and a result of the analyzing of the effective parameters.

2. The method of claim 1, wherein the template information includes a gender of the character or an age of the character, and the 2D image represents a character of the age having the gender.

3. The method of claim 2, wherein the template information further includes style information of the character, and
    wherein generating the 3D image of the character by performing the machine learning based on a result of the analysis related to the body parts and a result of the analyzing of the effective parameters includes
    performing the machine learning by using an inference engine that transforms a 3D image according to the style information.

4. The method of claim 1, wherein the template represents a silhouette, and the 2D image is an image of the character produced based on the silhouette.

5. The method of claim 4, wherein the effective parameters include a plurality of template images mapped to body parts.

6. The method of claim 5, further comprising
    determining a correlation between the template and the body parts of the character based on the 2D image,
    wherein the generating the 3D image of the character by performing the machine learning based on a result of the analysis related to the body parts and a result of the analyzing of the effective parameters includes
    performing the machine learning to synthesize the plurality of template images by using the correlation.

7. A system for generating a three-dimensional (3D) image of a character, the system comprising:
    a template library configured to store a plurality of templates representing a silhouette of the character;
    a pre-processing unit configured to receive a two-dimensional (2D) image of the character generated based on a template of the plurality of templates, wherein the pre-processing unit includes a first analyzer configured to perform analysis related to body parts of the character based on template information of the template and a second analyzer configured to analyze effective parameters on the 2D image for machine learning to be performed to generate the 3D image; and a modeling processor configured to generate the 3D image of the character by performing the machine learning based on a result of the analysis related to the body parts and a result of the analyzing of the effective parameters.

8. The system of claim 7, wherein the template information includes a gender of the character or an age of the character, and the 2D image represents a character of the age having the gender.

9. The system of claim 8, wherein
the template information further includes style information of the character, and
wherein the modeling processor further configured to perform the machine learning by using an inference engine that transforms the 3D image according to the style information.

10. The system of claim 7, wherein the 2D image is an image of the character produced based on the silhouette.

11. The system of claim 10, wherein the effective parameters include a plurality of template images mapped to the body parts.

12. The system of claim 11, wherein the pre-processing unit further configured to determine a correlation between the template and the body parts of the character based on the 2D image,
wherein the modeling processor further configured to perform the machine learning to synthesize the plurality of template images by using the correlation.

13. An apparatus for pre-processing image information of a character, the apparatus comprising:
a processor, a memory, and a transmission/reception interface, wherein the processor executes a program stored in the memory to perform:
receiving a two-dimensional (2D) image of the character generated on the basis of a template through the transmission/reception interface;

performing analysis related to body parts of the character based on template information of the template and analyzing effective parameters on the 2D image for machine learning to be performed to generate a three-dimensional (3D) image; and structuralizing a result of the analysis related to the body parts and a result of the analyzing of the effective parameters into a data structure and transmitting the data structure to a modeling processor performing the machine learning through the transmission/reception interface.

14. The apparatus of claim 13, wherein
the processor executes the program to further perform
determining a correlation between the template and the body parts of the character based on the 2D image, and
the processor, when structuralizing the result of the analysis related to the body parts and the result of the analyzing of the effective parameters into the data structure and transmitting the data structure to the modeling processor performing the machine learning through the transmission/reception interface, performs
structuralizing the correlation into the data structure along with the result of the analysis related to the body parts and the result of the analyzing of the effective parameters.

15. The apparatus of claim 13, wherein the template information includes style information of the character, the data structure includes instruction information regarding an inference neural network of the modeling processor, and the instruction information indicates an inference neural network corresponding to body parts of the character to the modeling processor.

16. The apparatus of claim 13, wherein the template information includes style information of the character, the data structure includes instruction information regarding an inference neural network of the modeling processor, and the instruction information indicates an inference neural network corresponding to the style information to the modeling processor.

* * * * *